(12) United States Patent
Lin

(10) Patent No.: US 9,122,068 B2
(45) Date of Patent: Sep. 1, 2015

(54) POLARIZATION CONVERTING ELEMENT GROUP FOR PROJECTION APPARATUS AND PROJECTION APPARATUS

(75) Inventor: Hung Ying Lin, Taoyuan-Hsien (TW)

(73) Assignee: DELTA ELECTRONICS, INC., Taoyuan-Hsien (TW)

( * ) Notice: Subject to any disclaimer, the term of this patent is extended or adjusted under 35 U.S.C. 154(b) by 359 days.

(21) Appl. No.: 13/547,404

(22) Filed: Jul. 12, 2012

(65) Prior Publication Data

US 2013/0215392 A1 Aug. 22, 2013

(30) Foreign Application Priority Data

Feb. 22, 2012 (TW) .............................. 101105714 A

(51) Int. Cl.

| G03B 35/26 | (2006.01) |
|---|---|
| G02B 27/26 | (2006.01) |
| G02B 27/22 | (2006.01) |
| G02B 27/28 | (2006.01) |
| G03B 21/20 | (2006.01) |
| H04N 9/31 | (2006.01) |

(52) U.S. Cl.
CPC ............ *G02B 27/26* (2013.01); *G02B 27/2264* (2013.01); *G02B 27/285* (2013.01); *G03B 21/2073* (2013.01); *H04N 9/3111* (2013.01); *H04N 9/3164* (2013.01); *H04N 9/3167* (2013.01)

(58) Field of Classification Search
CPC .. G02B 27/26; G02B 27/2264; G02B 27/285; G02B 21/2073; H04N 9/3167; H04N 9/3111; H04N 9/3164

USPC .............. 353/7, 8, 20, 82; 348/744, 751, 752, 348/759–762, 766, 771
See application file for complete search history.

(56) References Cited

U.S. PATENT DOCUMENTS

| 5,777,695 A * | 7/1998 | Yamagishi .................... 348/744 |
|---|---|---|
| 7,479,933 B2 | 1/2009 | Weissman |
| 2005/0231690 A1 | 10/2005 | Newell et al. |
| 2006/0092337 A1 * | 5/2006 | Howard et al. ................ 348/744 |
| 2008/0055401 A1 * | 3/2008 | DeCusatis et al. .............. 348/53 |
| 2009/0128780 A1 * | 5/2009 | Schuck et al. .................. 353/20 |
| 2012/0147331 A1 * | 6/2012 | Miyazaki ........................ 353/31 |

FOREIGN PATENT DOCUMENTS

| CN | 2465207 Y | 12/2001 |
|---|---|---|
| CN | 101950100 A | 1/2011 |
| TW | 363143 | 7/1999 |

(Continued)

*Primary Examiner* — Renee D Chavez
(74) *Attorney, Agent, or Firm* — Muncy, Geissler, Olds & Lowe, P.C.

(57) ABSTRACT

A polarization converting element group for a projection apparatus is disclosed. The polarization converting element group includes a polarization beam splitter and a half wave plate. The polarization beam splitter splits a light beam into a first polarized light beam with a first polarization direction and a second polarized light beam with a second polarization direction. The half wave plate is placed next to the polarization beam splitter and reciprocally moves between the first and second position. At different time points, the half wave plate changes the polarization direction of the first light beam or the second light beam passing therethrough. With this arrangement, the light beam that exits the polarization converting element group will either be a uniform first polarized light with a first polarization direction or a uniform second polarized light with a second polarization direction.

15 Claims, 5 Drawing Sheets

(56) References Cited

FOREIGN PATENT DOCUMENTS

| TW | 424156 B | 3/2001 |
| TW | 430746 B | 4/2001 |
| TW | I243960 | 11/2005 |
| TW | I259291 | 8/2006 |
| TW | I349113 | 9/2011 |

\* cited by examiner

← First polarization direction

← Second polarization direction

POLARIZATION CONVERTING ELEMENT GROUP FOR PROJECTION APPARATUS AND PROJECTION APPARATUS

This application claims priority to Taiwan Patent Application No. 101105714 filed on Feb. 22, 2012, which is hereby incorporated herein by reference in its entirety.

CROSS-REFERENCES TO RELATED APPLICATIONS

Not applicable.

BACKGROUND OF THE INVENTION

1. Field of the Invention

The present invention provides a polarization converting element group, and more particularly, to a polarization converting element group for a projection apparatus.

2. Descriptions of the Related Art

Over recent years, digital light processing (DLP) projection systems have become mainstream in the projection apparatus market because of the features, such as high brightness, vivid colors, rapid response and a light weight. In addition to conventional DLP projection systems for displaying flat images, there are also DLP projection systems for use as stereoscopic displaying projection systems.

Stereoscopic displaying projection systems may generally be categorized into eyeglass stereoscopic displaying projection systems and auto-stereoscopic displaying projection systems. Because of low manufacturing costs thereof, eyeglass stereoscopic displaying projection systems, which can be subdivided into active and passive eyeglasses, have been widely used.

Active eyeglasses, which are also known as shutter eyeglasses, operate projection apparatuses at different time sequences. Specifically, a grayscale picture is inserted between two frames by the projection system, and while receiving the grayscale picture, the active eyeglasses switch between the left-eye shutter and the right-eye shutter. For example, when a grayscale picture is received, the active eyeglasses turns on the left-eye shutter and then, a left-eye view-angle image is provided by the projection apparatus so that the user's left eye will receive the left-eye view-angle image. In this way, the left-eye and right-eye view-angle images are provided in alternating time sequences by the projection apparatus. However, because of the switching action between the two shutters, there is always one eye that is covered, and this shortens the time duration in which each eye can view the screen. Consequently, the brightness perceived by each eye of the viewer is reduced by at least 50%. Furthermore, the active eyeglasses adjust the light transmittance of the individual eyeglass lenses by use of liquid crystals, which makes them more expensive than passive ones. The switching structure and the associated control circuit also add to the weight of the eyeglasses, which makes the user uncomfortable. In other words, DLP projection systems using active eyeglasses are inevitably costly and are inconvenient to use.

Accordingly, it is important to provide a stereoscopic projection system that can work with passive eyeglasses and that has a low cost, a compact optical arrangement, a miniaturized volume and increased brightness.

SUMMARY OF THE INVENTION

The present invention provides a polarization converting element group for a projection apparatus, which comprises a polarization beam splitter and a half wave plate disposed next to the polarization beam splitter. The polarization beam splitter divides a light beam into a first polarized light beam with a first polarization direction and a second polarized light beam with a second polarization direction. The half wave plate moves in a reciprocating motion with respect to the polarization beam splitter. At the first time point, the half wave plate moves to a first position allowing the second polarized light beam to pass therethrough so that the second polarized light beam is turned into the second polarized light beam with the first polarization direction. The second polarized light beam with the first polarization direction is then combined with the first beam and formed into a uniformed first polarized light with the first polarization direction. Similarly, at a second time point, the half wave plate moves to a second position to allow the first polarized light beam to pass therethrough so that the first polarized light beam is turned into the first polarized light beam with the second polarization direction. The first polarized light beam with the second polarization direction is then combined with the second light beam into a uniformed second polarized light with the second polarization direction.

In brief, after entering the polarization converting element group, a light beam will be transformed into the first polarized light beam with the first polarization direction or the second polarized light beam with the second polarization direction and then exits.

The present invention further provides a projection apparatus comprising the aforesaid polarization converting element group. The projection apparatus at least comprises at least one light source, a light diffusing element, the aforesaid polarization converting element group and a light modulator. The light source generates a light beam. The defused light beam enters the light diffusing element, then the light beam enters the polarization converting element group. Then, the diffused light beam is transformed into a first polarized light beam at a first time point and a second polarized light beam at a second time point. The first view-angle image and the second view-angle image are received by the two eyes of a viewer wearing a pair of passive eyeglasses respectively so that a stereoscopic image is viewed.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. The present invention provides a polarization converting element group for a projection apparatus and the projection apparatus itself It shall be appreciated that in the following embodiments and attached drawings, the description of these embodiments is only for the purpose of illustration rather limitation. Meanwhile, in the following embodiments and the attached drawings, elements not directly related to the present invention are omitted from depiction; and the dimensional relationships among the individual elements in the attached drawings are illustrated only for ease of understanding but not to limit the actual scale, the actual size and the actual quantity.

Figure 1:
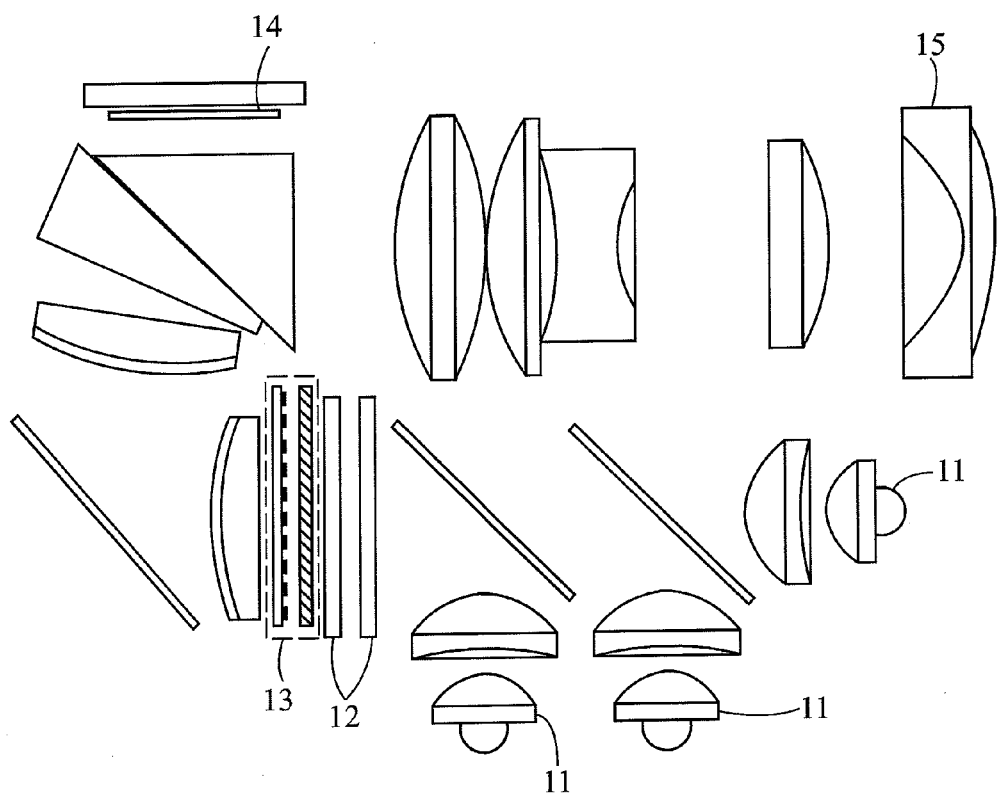
FIG. 1 is a schematic view illustrating the internal structure of the first embodiment of a projection apparatus of the present invention.

FIG. 1 illustrates a schematic view of the internal structure of the first embodiment of a projection apparatus of the present invention. The projection apparatus 1 comprises three light sources 11, a light diffusing element 12, a polarization converting element group 13, a light modulator 14 and a projection lens 15.

In this embodiment, the three light sources 11 are each light emitting diodes (LEDs), and can generate a light beam in sequence at different time points. In this embodiment, a red light, a blue light and a green light are provided in sequence. One of the three light sources could generate a light beam. The diffused light beam enters the light diffusing element 12 and then enters the polarization converting element group 13 in a parallel light form. The light beam is transformed by the polarization converting element group 13 into a first polarized light or a second polarized light. The first polarized light or the second polarized light is received and transformed by the light modulator 14 into a first view-angle image and a second view-angle image respectively for projection by the projection lens 15. The first view-angle image and the second view-angle image are received by two eyes of a viewer wearing a pair of passive eyeglasses respectively so that a stereoscopic image can be viewed.

In embodiments of the present invention, the light modulator may be a digital micro-mirror device or a liquid crystal display device. The light diffusing element may be a lens array, a fly lens, an integration rod or a light tunnel, although the present invention is not limited thereto.

Figure 2:
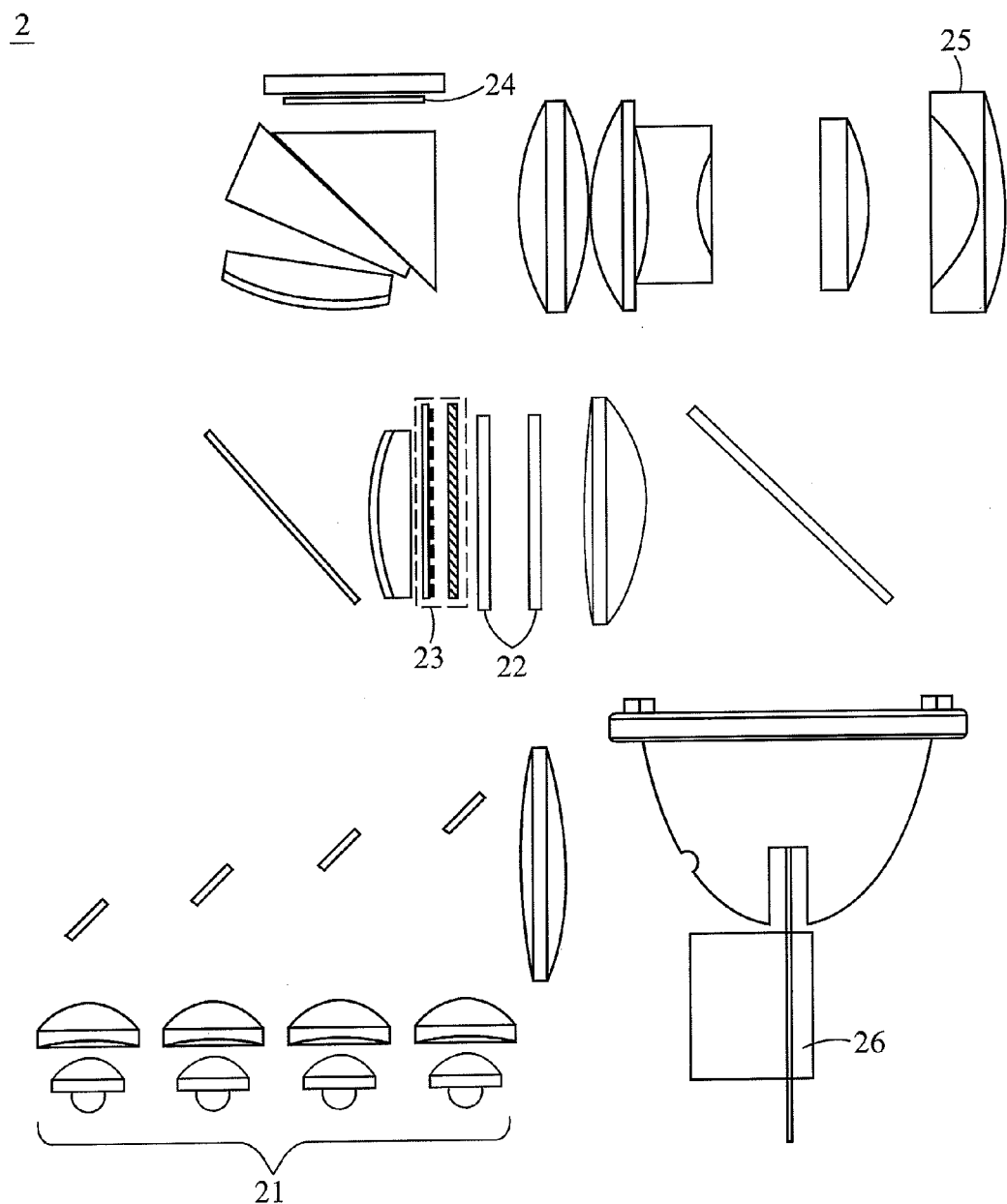
FIG. 2 is a schematic view illustrating the internal structure of the second embodiment of a projection apparatus of the present invention.

FIG. 2 illustrates a schematic view of the internal structure of a second embodiment of a projection apparatus of the present invention. The projection apparatus 2 of the second embodiment also comprises light sources 21, a light diffusing element 22, a polarization converting element group 23, a light modulator 24 and a projection lens 25. This embodiment differs from the first embodiment in that the light sources 21 are a plurality of blue laser light sources and are arranged in a different way from the previous embodiment. Moreover, a fluorescent wheel 26 is adopted to transform a blue laser light beam provided by the light sources 21 into a red light and a green light at different time points so that a colorful stereoscopic image is generated by the projection apparatus 2. The projection apparatus of this embodiment further comprises a paraboloidal reflector disposed at the side of the light sources 21 to converge and reflect the light beam generated by the light sources 21 into the light diffusing element 22. The relative relationships among and operations of the other elements are the same as those described in the first embodiment, and thus, will not be further described herein.

Figure 3A:
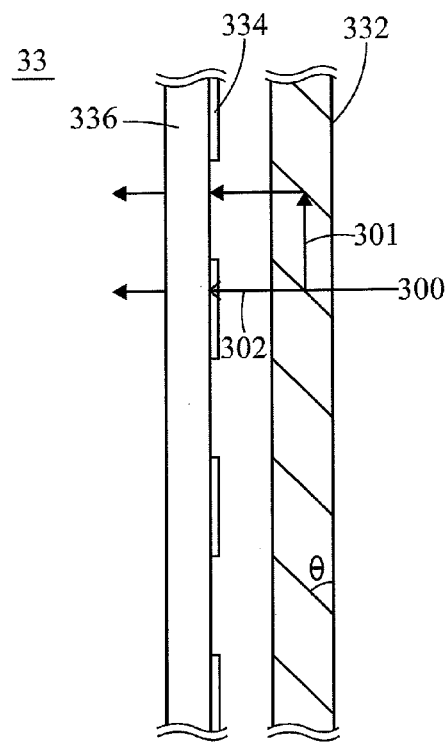
FIG. 3A is a partially enlarged view illustrating the first embodiment of a polarization converting element group of the present invention at the first time point.
Figure 3B:
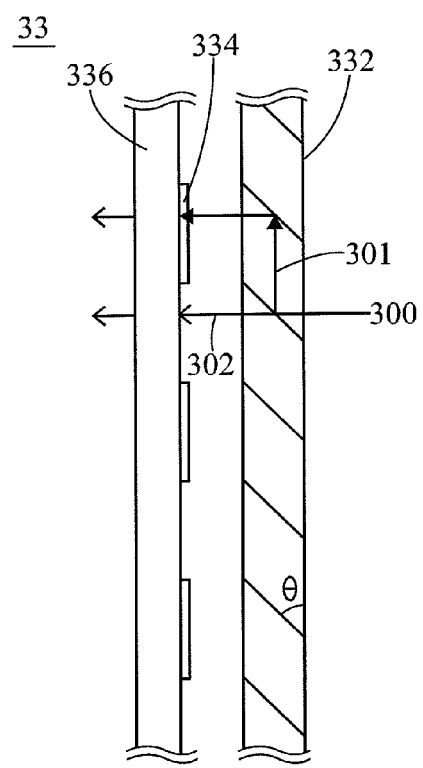
FIG. 3B is a partially enlarged view illustrating the first embodiment of the polarization converting element group of the present invention at the second time point.

FIGS. 3A and 3B show partially enlarged views illustrating a polarization converting element group of the present invention at a first time point and a second time point respectively. In the first embodiment of the polarization converting element group, the polarization converting element group 33 comprises a polarization beam splitter 332, a half wave plate 334 and a sheet glass 336. The half wave plate 334 is disposed at the side of the polarization beam splitter 332. Further, a half wave plate 334 is attached on the sheet glass 336. The polarization beam splitter 332 has a plurality of polarization plated films, each of which includes an angle +θ (or −θ) with a surface of the polarization beam splitter 332. The angle θ is 45 degrees in this embodiment, but is not limited thereto provided that the angle θ matches with the arrangement of the half wave plate 334. Furthermore, the polarization plated films of the polarization beam splitter 332 of this embodiment are arranged equidistantly and at equal angles. However, in other embodiments, the polarization plated films may also not be arranged equidistantly; different polarization beam splitter 332 may be provided with polarization plated films of different angles. In other embodiments, the half wave plate may also be formed on the sheet glass in other manners.

As shown, a light beam 300 entering the polarization beam splitter 332 is divided into a first polarized light beam 301 with a first polarization direction and a second polarized light beam 302 with a second polarization direction. In this embodiment, the first polarized light beam 301 with the first polarization direction is an S polarized light beam reflected by the polarization plated films, while the second polarized light beam 302 with the second polarization direction is a P polarized light beam passing through the polarization plated films.

The present invention is unique in that the half wave plate can reciprocate between a first position and a second position with respect to the polarization beam splitter. As shown in FIG. 3A, at the first time point, the half wave plate 334 moves to a first position to allow the second polarized light beam 302 that originally has the second polarization direction to pass therethrough so that the second polarized light beam 302 is turned into the second polarized light beam 302 with the first polarization direction. Then, the second polarized light beam 302 with the first polarization direction is combined with the first polarized light beam 301 into a uniformed first polarized light with the first polarization direction. Similarly, as shown in FIG. 3B, at a second time point, the half wave plate 334 moves to a second position to allow the first polarized light beam 301 that originally has the first polarization direction to pass therethrough so that the first polarized light beam 301 is turned into the first polarized light beam 301 with the second polarization direction. Then, the first polarized light beam 301 with the second polarization direction is combined with the second polarized light beam 302 into a second polarized light with the second polarization direction. It shall be supplemented that the term "reciprocate" described herein may mean "moving back and forth from up to down" or "moving back and forth from left to right"; however, in other embodiments, the way in which the half wave plate reciprocates may vary with the arrangement of the half wave plate.

In brief, after entering the polarization converting element group 33, the light beam 300 is transformed into the first polarized light with the first polarization direction at the first time point and is transformed into the second polarized light with the second polarization direction at the second time point. Through the disposition of the half wave plate in the present invention, light beams with different polarization directions are transformed into a same direction, so the brightness loss can be minimized through recycling.

Figure 4A:
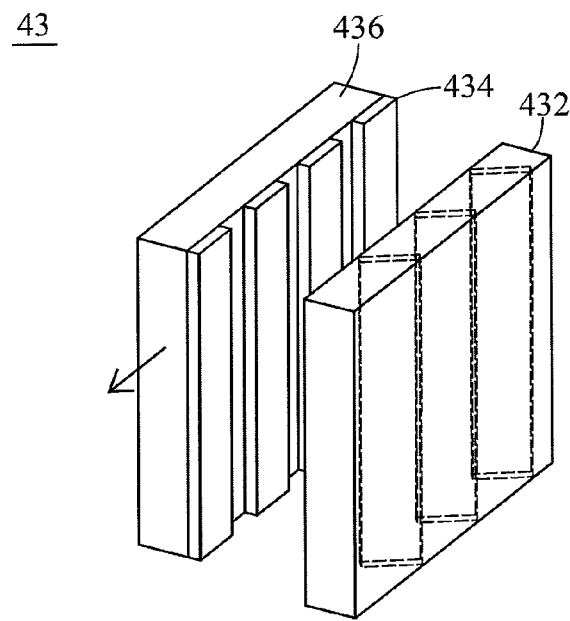
FIG. 4A is a schematic view illustrating the second embodiment of the polarization converting element group of the present invention.
Figure 4B:
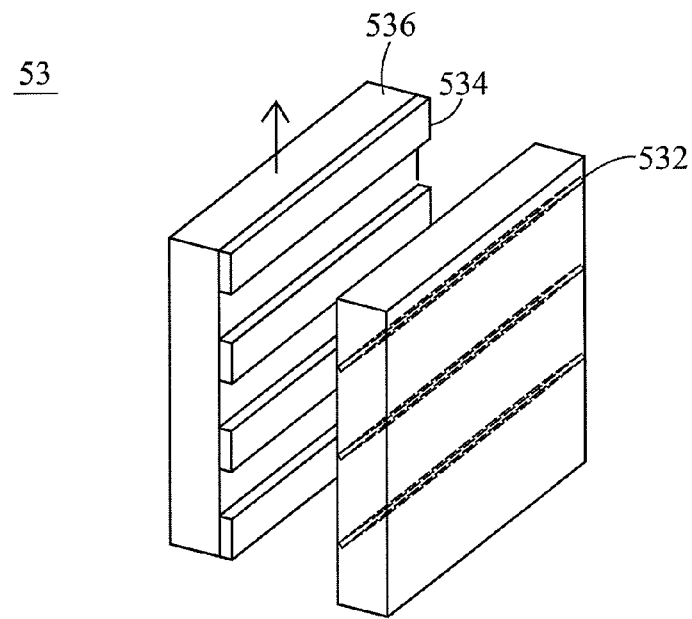
FIG. 4B is a schematic view illustrating the third embodiment of the polarization converting element group of the present invention.

Next, FIGS. 4A and 4B illustrate schematic views of the second embodiment and third embodiment of the polarization converting element group of the present invention respectively. In these two embodiments, a polarization converting element group 43 comprises a polarization beam splitter 432, a half wave plate 434 and a sheet glass 436; while another polarization converting element group 53 comprises a polarization beam splitter 532, a half wave plate 534 and a sheet glass 536. FIGS. 4A and 4B illustrate possible implementations where the half wave plates 434, 534 are attached onto the sheet glasses 436, 536. It shall be appreciated that the quantities of the half wave plates 434, 534 and the polarization beam splitters 432, 532 in these embodiments are only illustrative, and may be increased or decreased optionally in actual implementations.

In the second embodiment, as shown in FIG. 4A, the half wave plate 434 is attached on the sheet glass 436 in a longitudinal direction. Therefore in, actual implementations, the half wave plate 434 will move from side to side (in a direction shown by an arrow) with respect to the polarization beam splitter 432. Similarly, in the third embodiment, as shown in FIG. 4B, the half wave plate 534 is attached onto the sheet glass 536 in a horizontal direction and, in this case, the half wave plate 534 will move up and down (in a direction shown by an arrow) with respect to the polarization beam splitter 532.

Figure 5A:
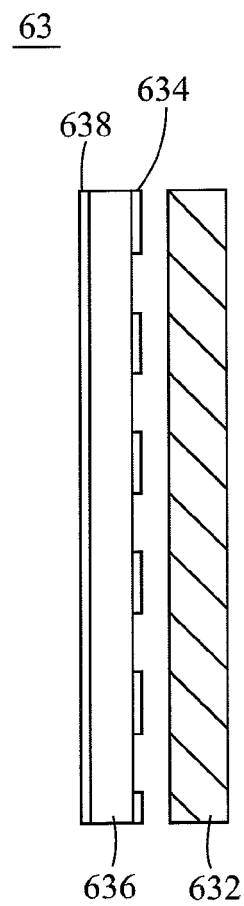
FIG. 5A is a side view illustrating the fourth embodiment of the polarization converting element group of the present invention.
Figure 5B:
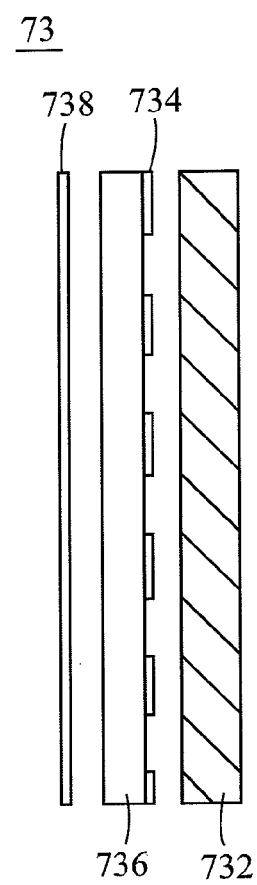
FIG. 5B is a side view illustrating the fifth embodiment of the polarization converting element group of the present invention.

Finally, FIGS. 5A and 5B illustrate schematic views of the fourth embodiment and fifth embodiment of the polarization converting element group of the present invention respectively. The polarization converting element group of the present invention may further comprise a quarter wave plate with the half wave plate disposed between the quarter wave plate and the polarization beam splitter, so the following description will focus on differences between the respective embodiments and the previous embodiment.

A polarization converting element group 63 as shown in FIG. 5A comprises a polarization beam splitter 632, a half wave plate 634, a sheet glass 636 and a quarter wave plate 638. The half wave plate 634 is formed on the first surface of the sheet glass 636, while the quarter wave plate 638 is formed on the other surface (a second surface) of the sheet glass 636 and opposite to the half wave plate 634. FIG. 5B shows a polarization converting element group 73 arranged in another way. In this embodiment, the polarization converting element group 73 also comprises a polarization beam splitter 732, a half wave plate 734, a sheet glass 736 and a quarter wave plate 738, but differs from the embodiment shown in FIG. 5A in that the quarter wave plate 738 is disposed separately on the side of the sheet glass 736 rather than being directly formed on the surface of the sheet glass 736. Furthermore, an embodiment in which the half wave plate is directly formed and attached on the quarter wave plate (not shown) is also possible.

Expanding on the above, the purpose of further comprising the quarter wave plate in the polarization converting element group of the present invention is that the first polarized light or the second polarized light formed through the transformation by the half wave plate could be transformed into an elliptically polarized light or a circularly polarized light to enlarge the angle range that can be effectively viewed by the viewer.

According to the above descriptions, the present invention provides a polarization converting element group for a projection apparatus. By using a half wave plate that reciprocates between the first and second position at different time points, a light beam entering the polarization converting element group can be transformed and coupled into uniformed polarized direction light beams (a first polarized light or a second polarized light) at different time points. When being used in a projection apparatus, the first polarized light and the second polarized light are transformed by a light modulator into a first view-angle image and a second view-angle image respectively so that a stereoscopic image can be seen by the user wearing a pair of passive eyeglasses. In other words, with the aforesaid arrangement, a stereoscopic projection system that has a low cost, a compact optical arrangement, a miniaturized volume and increased brightness can be designed according to the present invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A polarization converting element group for a projection apparatus, comprising:
   a polarization beam splitter, having a plurality of polarization plated films, wherein each of the polarization plated films includes an angle with a surface of the polarization beam splitter to divide a light beam into a first polarized light beam with a first polarization direction and a second polarized light beam with a second polarization direction; and
   a plurality of half wave plates, disposed next to the polarization beam splitter and moving in a reciprocating motion with respect to the polarization beam splitter;
   wherein at a first time point, each of the half wave plates moves to a first position to face one of the polarization plated films to allow the second polarized light beam to pass therethrough and turn into the second polarized light beam with the first polarization direction; and at a second time point, each of the half wave plates moves to a second position to face another one of the polarization plated films to allow the first polarized light beam to pass therethrough and turn into the first polarized light beam with the second polarization direction.

2. The polarization converting element group as claimed in claim 1, further comprising a quarter wave plate, and the half wave plates are sandwiched between the quarter wave plate and the polarization beam splitter.

3. The polarization converting element group as claimed in claim 1, further comprising a sheet glass comprising a first surface, and the half wave plates are disposed on the first surface.

4. The polarization converting element group as claimed in claim 3, further comprising a quarter wave plate, which is disposed on a second surface of the sheet glass, wherein the second surface is opposite to the first surface.

5. The polarization converting element group as claimed in claim 1, wherein the half wave plates are disposed on a surface of a quarter wave plate.

6. A projection apparatus, comprising:
   at least one light source, generating a light beam;
   a light diffusing element, diffusing the light beam;
   a polarization converting element group, receiving the diffused light beam, and the polarization converting element group comprising:

a polarization beam splitter, having a plurality of polarization plated films, wherein each of the polarization plated films includes an angle with a surface of the polarization beam splitter to divide the diffused light beam into a first polarized light beam with a first polarization direction and a second polarized light beam with a second polarization direction; and a plurality of half wave plates, disposed next to the polarization beam splitter and moving in a reciprocating motion with respect to the polarized beam splitter;

wherein at a first time point, each of the half wave plates moves to a first position to face one of the polarization plated films to allow the second polarized light beam to pass therethrough and turn into the second polarized light beam with the first polarization direction; and at a second time point, each of the half wave plates moves to a second position to face one of the polarization plated films to allow the first polarized light beam to pass therethrough and turn into the first polarized light beam with the second polarization direction; and a light modulator, receiving the first polarized light beam and the second polarized light beam, wherein at the first time point, the first polarized light beam and the second polarized light beam are transformed into a first view-angle image; and at the second time point, the first polarized light beam and the second polarized light beam are transformed into a second view-angle image.

7. The projection apparatus as claimed in claim 6, further comprising a paraboloidal reflector disposed next to the at least one light source to converge and reflect the light beam.

8. The projection apparatus as claimed in claim 6, wherein the light diffusing element is a lens array.

9. The projection apparatus as claimed in claim 6, wherein the light diffusing element is a fly lens.

10. The projection apparatus as claimed in claim 6, wherein the light diffusing element is an integration rod.

11. The projection apparatus as claimed in claim 6, wherein the light diffusing element is a light tunnel.

12. The projection apparatus as claimed in claim 6, wherein the light modulator is a digital micro-mirror device.

13. The projection apparatus as claimed in claim 6, wherein the light modulator is a liquid crystal display device.

14. The projection apparatus as claimed in claim 6, wherein the at least one light source is a light emitting diode.

15. The projection apparatus as claimed in claim 6, wherein the at least one light source is a plurality of blue laser light sources.

* * * * *